Aug. 15, 1944.  D. W. PRICE  2,356,004
SHAKER
Filed Oct. 5, 1942   2 Sheets-Sheet 1

Duane W. Price
INVENTOR.
By: Clarence E. Threedy
HIS ATTORNEY.

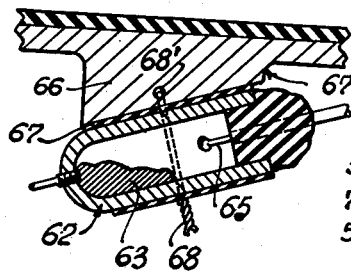
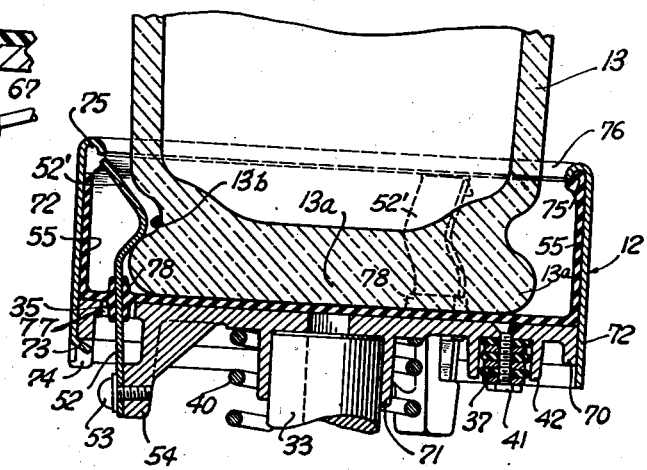
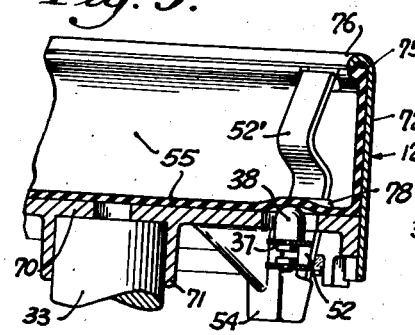
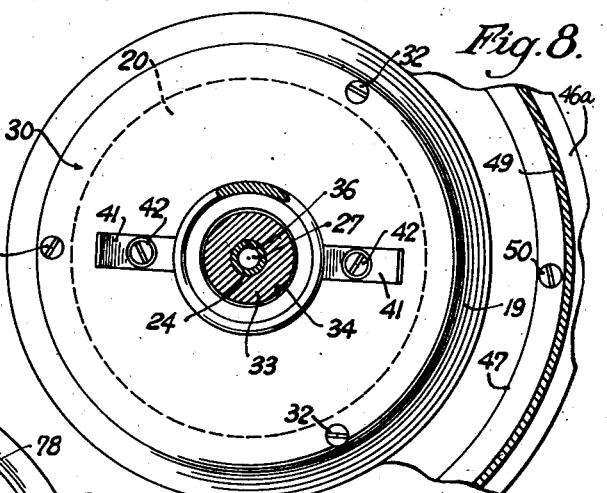
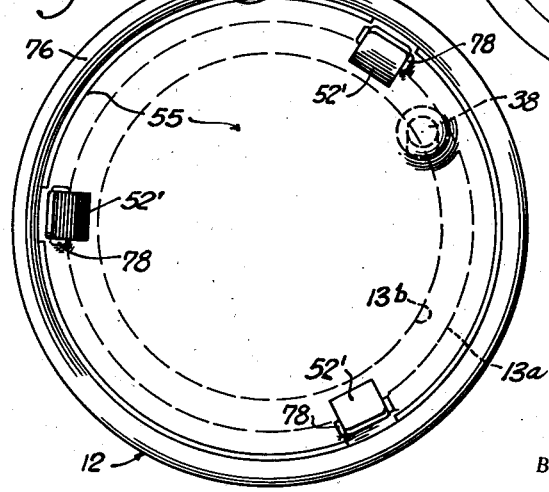
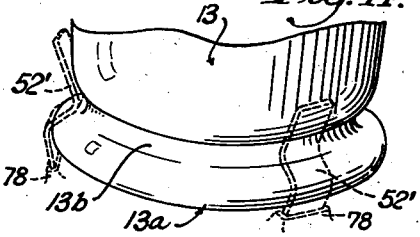

Patented Aug. 15, 1944

2,356,004

UNITED STATES PATENT OFFICE 2,356,004

SHAKER

Duane W. Price, Chicago, Ill., assignor to Walter C. Hoy, Chicago, Ill.

Application October 5, 1942, Serial No. 460,806

4 Claims. (Cl. 259—144)

This invention relates to agitating devices and more particularly to a shaker or drink mixer, one of the principal objects being the provision of a device of this class in which a receptacle carrier is arranged for vertical reciprocation by the intermittent energization of a solenoid which has the axis of its bore aligned concentrically with the reciprocal axis of the carrier or support.

One of the important objects of the invention is the provision of an improved container support in the nature of a cuplike member having formations on its underside for attachment to the top of the solenoid armature, and other formations on its underside constituting mounting members for presser fingers, which engage and secure the mixing container or glass in the cup.

A further object is the provision of a rubber liner for the supporting cup, and through which the gripping fingers project and which is sealed about the gripping fingers to prevent leakage into the shaker mechanism.

A further object is the combination of a mixing container or glass having integral formations in its bottom region for holding engagement with yieldable gripping fingers in the supporting cup, whereby the container may be readily snapped into and out of position in the shaker.

Yet another object is the provision of a supporting cup having, in addition to the foregoing formations on its underside, an integral seat adapted to support a mercury or other inertia type switch at a certain angle for coaction with the solenoid motor.

A still further object is an especially arranged master switch means mounted on the underside of the supporting cup for actuation by a mixing vessel or glass secured in the cup by the gripping fingers aforesaid.

Viewed from another aspect, it is an important object of the invention to provide an open-mouth container preferably of transparent material, and closure means therefor which may be locked on the open mouth of the container when a substance to be mixed is disposed therein, the container closure being locked in inverted position on the support of a power-driven mixing device.

Another object is the provision of an open-mouth container preferably of transparent glass, with locking formations at its mouth for engagement with a closure and other locking formations for engagement with a support whereby the container may be seated and locked in a carrying member or support with the closure in locking engagement with the container and further secured in closed position by engagement with the carrying member or support.

A more particular object is the combination of an open-mouth container jar having locking formations for engagement with a closure cap, and other locking formations arranged about its mouth adjacent the closure cap for locking engagement with a cup-shaped support arranged on a drink mixer for agitation by the latter and in such position that the container jar may be secured therein in inverted position.

Still another object is the provision in the aforementioned combination, of resilient means on the closure cap for engagement with the supporting cup to provide a form of shock absorber and also to provide a yieldable means, further assuring the interlocking engagement of the container jar with the supporting cup during agitation.

A further object relates to the provision of cover means for the solenoid well and mounting of an actuating spring on the cover means for cooperation with the armature, together with a particular construction of the base member to provide for circulation of air within the well for the purpose of cooling the solenoid winding.

Other objects, advantages and novel aspects of the invention reside in certain details of construction as well as the cooperative relationship of the component parts of the illustrative embodiment described hereinafter in view of the annexed drawings, in which:

Fig. 6 is a sectional detail through the mercury switch, taken along line 6—6 of Fig. 3;

Fig. 7 is a vertical sectional detail through the supporting cup and bottom of the mixing glass, similar to that shown in Fig. 2 but at a larger scale;

Fig. 8 is a plan view of the drive means looking down from line 8—8 in Fig. 2;

Fig. 9 is a fragmentary vertical section through the master switch means, looking in the direction of line 9—9 of Fig. 3;

Fig. 10 is a top plan view of the supporting cup; and

Fig. 11 is a fragmentary perspective of the bottom of the mixing glass, illustrating the engagement thereof with the gripping fingers.

Figure 1:
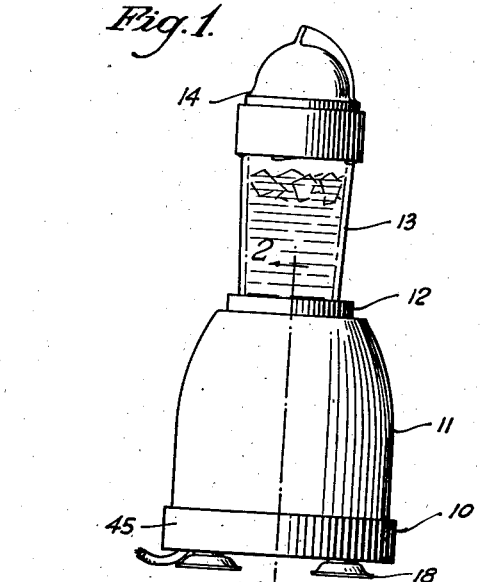
Fig. 1 is an elevational view of the complete shaker structure.

The present invention discloses improvements over certain shaker structures heretofore known, these improvements being incorporated in a drink mixer of the type shown in Fig. 1 and which includes broadly a base structure generally indicated at 10, a housing portion 11, a container receptacle or support 12 arranged to reciprocate relative to an opening in the top of the housing jacket and in which is removably secured a glass mixing receptacle 13 provided with a cover structure 14.

Figure 2:
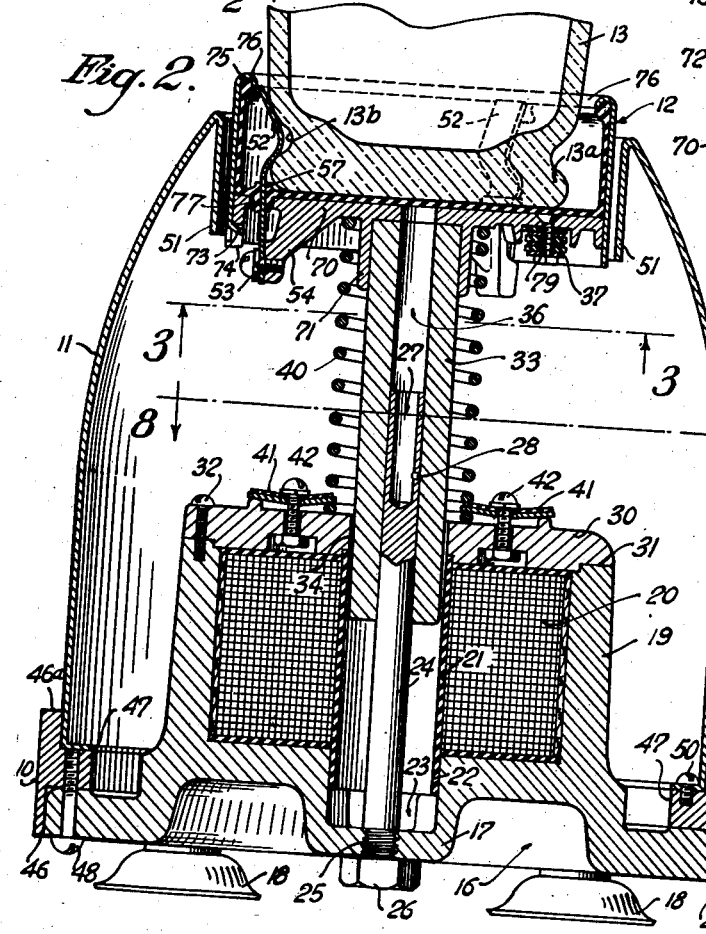
Fig. 2 is a fragmentary vertical section to enlarged scale taken along line 2—2 of Fig. 1.

Referring to Fig. 2, the improved motor means of the present invention includes a base casting 16 of aluminum or other non-magnetic material, and preferably annular in form, with a centrally depending boss 17. Suction cup legs 18 are preferably supplied for the purpose of spacing the bottom of the base from a table or like support.

From the upper surface of the base casting projects an annular wall 19 arranged concentrically of the boss 17 and constituting a well in which is mounted a solenoid winding 20 having its bore disposed concentrically of the well and boss 17 and preferably centered in the well by the use of a non-magnetic sleeve 21 of Micarta or the like, with a lower extended part 22 fitting closely into the bore of the boss 17 so that the winding is substantially centered. It may be observed at this juncture that the boss 17 is provided with opposite air passages 23 communicating into space on the underside of the base for purposes hereinafter to appear.

Means for guiding the shaker armature includes the provision of a guide rod 24 having a lower threaded end portion 25 projected concentrically through the bottom of the boss 17 for engagement with a holding nut 26 which rigidly secures the rod in upstanding position on the base concentrically of the bore of the solenoid. At its upper end, the guide rod has an axially extending bore 27 with a lateral feeder opening 28 leading out the side of the rod, this bore being adapted to retain a quantity of grease or other lubricant which is fed as needed automatically through the opening 28.

The solenoid assembly is completed by the application of a cap member 30 having an annular shoulder portion 31 interfitting closely with complementary shoulder formations at the mouth of the well and provided with a central opening 34 through which the solenoid armature projects, the cap being retained in position by means of a plurality of screws 32 spaced about its peripheral portions.

The solenoid armature 33 is an elongated cylindrical rod having an axially extending bore 36 which interfits closely but freely with the rod 24 so as to be easily reciprocable on the latter and guided for perfectly uniform movement into and out of the bore of the solenoid. The container support or carrier structure 12 is in the nature of a cup, provided on its underside with a boss having an annular bore fitting onto the upper end of the armature 33 and secured to the latter by means such as a set screw.

Figure 3:
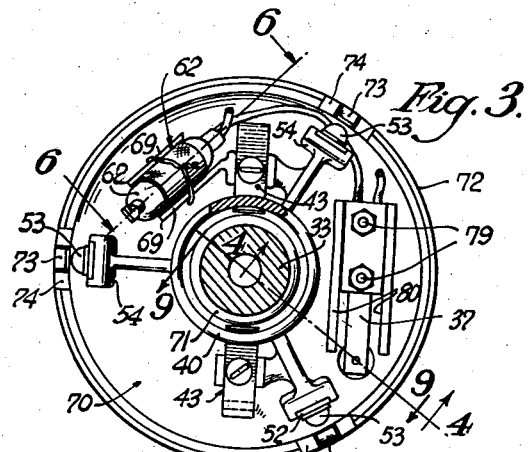
Fig. 3 is a bottom plan view of the container support or carrier looking up in the direction of line 3—3 of Fig. 2.
Figure 4:
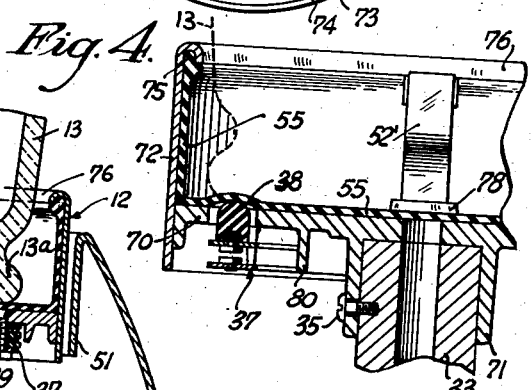
Fig. 4 is a fragmentary vertical section enlarged and taken in the direction of line 4—4 of Fig. 3 to show the container-operated switch.

The armature is normally withdrawn from the solenoid by action of a compression spring 40 secured at its lower end by means of lugs 41 and screws 42 which clamp the endmost turn of the spring tightly against the top of the cap plate 30, similar clamping means 43 (Fig. 3) being employed on the underside of the cup support 12. As a result of this structure, the supporting cup is normally elevated so that only a small lower end portion of the armature remains within the bore of the solenoid.

To complete the motor structure, there is provided a ring 45 (Figs. 1 and 2) having a lower annular skirt portion 46 which fits closely onto the base member 16 with an annular intermediate shoulder portion 47 resting on the top peripheral portions of the base member and tapped to receive retaining screws 48 securing the ring to the base. The ring is further provided with an upper annular skirt 46a into which is fitted the lower portion of a housing jacket 49, ears being offset from the bottom edge of the jacket and secured by means of screws 50 to the shoulder portion 47. It may be observed that the upper end of the jacket is turned or spun inwardly to provide a collar 51 loosely surrounding the receptacle cup or support to provide a trim for the top of the assembly.

The supporting cup 12, as shown in Fig. 2, includes a base casting 70 provided with a central boss 71 bored to fit upon the upper end of the armature 33 to which it is secured by means of a set screw, or shrinking.

The side wall of the cup 12 is formed by a rim portion 72 (Figs. 2 and 3) fitted onto the base member 70 and having bottom edge portions 73 crimped over between spaced depending lugs 74 on the bottom of the base plate. A rubber apron or liner 55 of cup shape is fitted closely into the interior of the cup and has its upper edge 75 beaded or enlarged so as to be securely engaged by an inturned rim portion 76 of the main cup rim or ring 72.

Spaced in a circumferential sense around the underside of the base plate 70, are finger mounting lugs 54 to each of which is attached by means of screws 53, a spring gripping finger 52 projecting up through an opening 77 formed in the casting and having a crimped end portion 52'. The mounting lugs 54 depend from the base plate a distance sufficient to provide adequate leverage for the gripping fingers and also to facilitate the installation and removal of the same. An important feature of the foregoing arrangement is the means for sealing the passage of the fingers through the rubber liner, this being accomplished preferably by forming integral sealing sleeves 78 in the rubber liner and which are adapted to embrace the fingers tightly to such an extent that passage of moisture from the cup portion into the mechanism in the housing 11 will be substantially prevented.

A further feature of the invention resides in the construction of the mixing vessel or glass 13 with a massive base portion 13a in which there is formed a circumferential groove 13b situated for interlocking engagement with the crimped portions 52' of the spring gripping fingers 52 when the bottom of the glass is seated against the bottom of the supporting cup. In the preferred arrangement, the gripping fingers 52 yield to the camming action of the bottommost edge parts of the portion 13a of the glass when the latter is pressed into position in the cup, the fingers thereafter springing into locked relationship with the bottom of the glass and holding the latter rigidly in place during reciprocation of the seating cup.

A feature of the invention is the provision of a master switch 37 of the leaf spring variety secured as at 79 to the underside of the base plate 70 between a pair of parallel ribs 80 cast integrally thereon and serving to maintain the switch rigidly in operative position with one end portion thereof underlying the bottom rim portion of the mixing glass 13. One of the contact springs of the master switch is provided with an insulated button 38 which projects through a hole in the base plate and bears against the underside of the rubber liner so as to project for engagement with the bottom of the mixing glass when the latter is sprung into mixing position, the combined weight of the glass and gripping action of the fingers 52 serving to move the contact spring through the agency of the button 38 into contact closing engagement with the companion spring to close a main power circuit for the solenoid 20 and inertia switch associated therewith.

The inertia switch 62 (Fig. 3) preferably consists of a glass or metal envelope of tubular form (Fig. 6 also) having a pair of contacts 65 sealed in one end for connection, via conductors 61 in the main power circuit, with switch 37 and in series with the solenoid 20. A globule 63 of mercury is relied upon as the inertial circuit-closing element, the switch being adapted to be mounted with its axis (that is, the axis of inertial displacement of the mercury) projecting at an angle to the line of reciprocation of the armature 33 in such manner that when the shaker is not in operation the mercury globule will rest out of engagement with contacts 65 not shown in Fig. 6, a quick lowering movement of the cup 12 being effective to cause the globule to close the circuit between contacts 65 and energize the solenoid provided the mixing glass 13 is in position as aforesaid; thereafter the circuit closing action of the mercury globule is automatic until the shaker is stopped by restraining action of the hand against the mixing glass.

The mercury switch is mounted at its angle of optimum efficiency by the provision of an integral projection 66 (Fig. 6) on the underside of the base plate and having a seating surface 67 extending at an angle to the plane of the base plate (and hence, to the line of reciprocation of the armature attached thereto), the seating portion 67 of the integral projection being preferably curved between opposite sides 69 thereof to conform to the curvature of the switch 62. The switch is conveniently mounted in its seat 66 by means of a twisted wire 68 extending therearound through a hole 68' in the formation 66.

Figure 5:
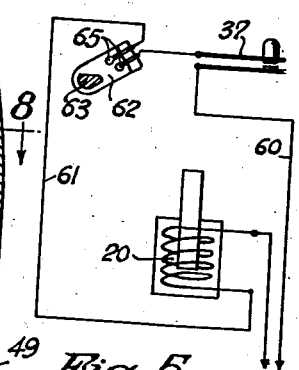
Fig. 5 is a circuit diagram.

Assuming that the glass 13 has been filled with a substance to be mixed and the cap structure 14 applied thereto, the glass is forced into the supporting cup 12 to force springs 52 to lock in the channel portions 13b, whereupon the glass is seated firmly for the subsequent rapid reciprocation imparted thereto. When the glass is thus seated, the underside thereof will engage the pin 38, as a result of the flexibility of the apron 55, and close this switch to complete a circuit via conductors 60 and 61 (Fig. 5) from the line or power source and through the gravity switch 62 of the mercury type connected in circuit with solenoid winding 20.

Mere insertion of the mixing glass 13 does not, in this arrangement, automatically start the shaker, it being necessary to depress the cup 12 more or less abruptly by a downward pressure on the cap 14, so as to cause the normally open-circuit mercury switch (Fig. 6) to become closed by reaction of the mercury globule 63 in engaging the contacts 65 which are connected in the aforesaid power circuit for the solenoid.

As a result of the displacement of the mercury globule, the solenoid will be energized to attract the armature 33 and compress tension spring 40, and, meanwhile, the mercury globule will fall back into open circuit position and de-energize the solenoid winding so that the spring may restore the armature and container support abruptly to normally raised position, which latter movement again causes the mercury globule to close the power circuit with a repetition of the foregoing cycle, resulting in moderately rapid reciprocation of the armature and mixing container. The mixing action may be stopped by manually arresting movement of the container to enable the mercury globule to come to rest.

The moderately rapid reciprocation of the lower portion of armature 33 in the sleeve 21, effects a continuous displacement of air relative to the openings 23, with a consequent cooling of the solenoid winding. Similar cooling is effected through heat transfer to the walls of the solenoid well 19 and the surrounding air within jacket 49, which air is agitated by displacement of the cup structure 12 relative to the upper open portions 51 of the jacket or housing.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In a device of the class described, seating means for a mixing container comprising a cup adapted for attachment to reciprocating means, spring gripping fingers attached to said cup on the underside thereof and projecting up through the bottom of the cup in mutually spaced relation for gripping engagement with complementary gripping means on said container, and a moisture impervious liner in said cup and having collar portions intimately engaging said fingers and sealing off the same against passage of moisture from the upper to the underside of the cup around said fingers.

2. In a shaker, in combination, a vertically reciprocable seat for a mixing container, a plurality of vertically extending circumferentially arranged spring fingers projecting from said seat and each having an offset detent formation, and a mixing container having a bottom with complementary detent receiving portions formed therein and into which said detent portions of the fingers are sprung in gripping engagement with the container when the latter is forced into said seat concentrically of said fingers.

3. In a drink mixer including a vertically reciprocable member and electrical drive means therefor, a seating cup for a mixing container mounted on said reciprocable member, switch means mounted on the underside of said cup with an operating portion extending into the latter for engagement and actuation by a container seated therein, and a flexible cup-shaped liner of moisture impervious non-conductive material fitted into said cup and preventing moisture from reaching the underside of the cup and said switch means, operative engagement between said container and operating portion of the switch means being effected by pressure of the container against the liner and thence against said operating portion.

4. In a drink mixer of the type having an electrically reciprocated drive member, a seating cup mounted on said drive member and adapted to retain a mixing receptacle, switch means mounted on the underside of said cup and operatively associated with the electric drive means for said drive member and adapted to be operated by a receptacle in said seating cup, releasable receptacle gripping means projecting upwardly from the bottom of said cup for engagement with said receptacle, and a cup-shaped liner fitted snugly into said cup and constructed of moisture-impervious non-conductive flexible material having portions fitting tightly about said gripping means, said switch means being provided with an operating button projecting through an opening in the bottom of said cup beneath the bottom of said receptacle for movement by the latter, portions of said liner being interposed between the receptacle and button and yielding for actuation of the latter by pressure of the receptacle.

DUANE W. PRICE.